United States Patent [19]
Jackson et al.

[11] Patent Number: 5,921,162
[45] Date of Patent: Jul. 13, 1999

[54] INCLINE DISC VARIABLE TARGET SIZE SAWGUIDES FOR CIRCULAR GANG SAWS

[75] Inventors: James Jackson; Steven Michell; John Sergeant, all of Salmon Arm, Canada

[73] Assignee: CAE Newnes Ltd., Salmon Arm, Canada

[21] Appl. No.: 08/821,659

[22] Filed: Mar. 20, 1997

Related U.S. Application Data

[60] Provisional application No. 60/013,858, Mar. 22, 1996.

[51] Int. Cl.⁶ ...................................................... B27B 5/34
[52] U.S. Cl. ........................... 83/829; 83/425.4; 83/508.3; 83/821
[58] Field of Search ..................................... 83/821, 425.3, 83/425.4, 428, 433, 498, 499, 504, 508.2, 508.3, 665, 698.51, 698.61, 827, 828, 829

[56] References Cited

U.S. PATENT DOCUMENTS

| | | | |
|---|---|---|---|
| 674,997 | 5/1901 | Christensen | 83/508.3 |
| 3,003,531 | 10/1961 | Niebuhr | 83/829 |
| 3,285,302 | 11/1966 | Thrasher | 83/829 X |
| 3,688,820 | 9/1972 | Lundblom | 83/169 |
| 3,742,796 | 7/1973 | McMillan | 83/102.1 |
| 3,750,513 | 8/1973 | Cromeens | 83/425.4 |
| 3,828,635 | 8/1974 | Smith | 83/425.4 X |
| 3,992,614 | 11/1976 | Buss | 235/151.1 |
| 4,414,875 | 11/1983 | Pearson | 83/508.3 |
| 4,635,513 | 1/1987 | McGeehee | 83/821 X |
| 4,690,188 | 9/1987 | Hasenwinkle | 144/378 |
| 4,848,200 | 7/1989 | McGehee | 83/169 |
| 4,909,112 | 3/1990 | Rosenthal | 83/425.4 |
| 4,961,359 | 10/1990 | Dunham | 83/821 X |
| 4,977,802 | 12/1990 | Kirbach | 83/13 |
| 5,287,782 | 2/1994 | Scott | 83/447 |
| 5,325,751 | 7/1994 | Green et al. | 83/13 |
| 5,809,859 | 9/1998 | Stroud et al. | 83/425.4 X |

FOREIGN PATENT DOCUMENTS

| | | | |
|---|---|---|---|
| 924220 | 4/1973 | Canada | 83/828 |
| 1579779 | 7/1990 | U.S.S.R. | 83/821 |

*Primary Examiner*—Clark F. Dexter
*Attorney, Agent, or Firm*—Antony C. Edwards

[57] ABSTRACT

A first collar is releasably slidably journalled onto a selectively rotatable shaft so as to lie in a first plane generally perpendicular to the shaft. The first collar has a first helically inclined cam surface extending between a thin portion of the first collar and a thick portion of the first collar. A second collar is releasably mountable onto the shaft into fixed relation relative to the shaft, so as to lie in a second plane generally parallel to the first plane. The second collar has a cam follower surface such as a second helical inclined cam surface for sliding engagement over the first helically inclined cam surface between the thick portion and the thick portion of the first collar upon selective rotation of the shaft. First and second sawguides are slidably mounted on the shaft for longitudinal sliding thereon on opposed sides of the first and second collars. The first sawguide has the first collar rigidly mountable thereto, the first collar being adjacent the second collar. The second sawguide is adjacent the second collar. A press is provided for urging the first and second sawguides slidably towards each other along the shaft against the first and second collars respectively. The longitudinal translation of the second collar along the shaft relative to the first collar causes relative longitudinal translation between the first and second sawguides on the shaft.

5 Claims, 8 Drawing Sheets

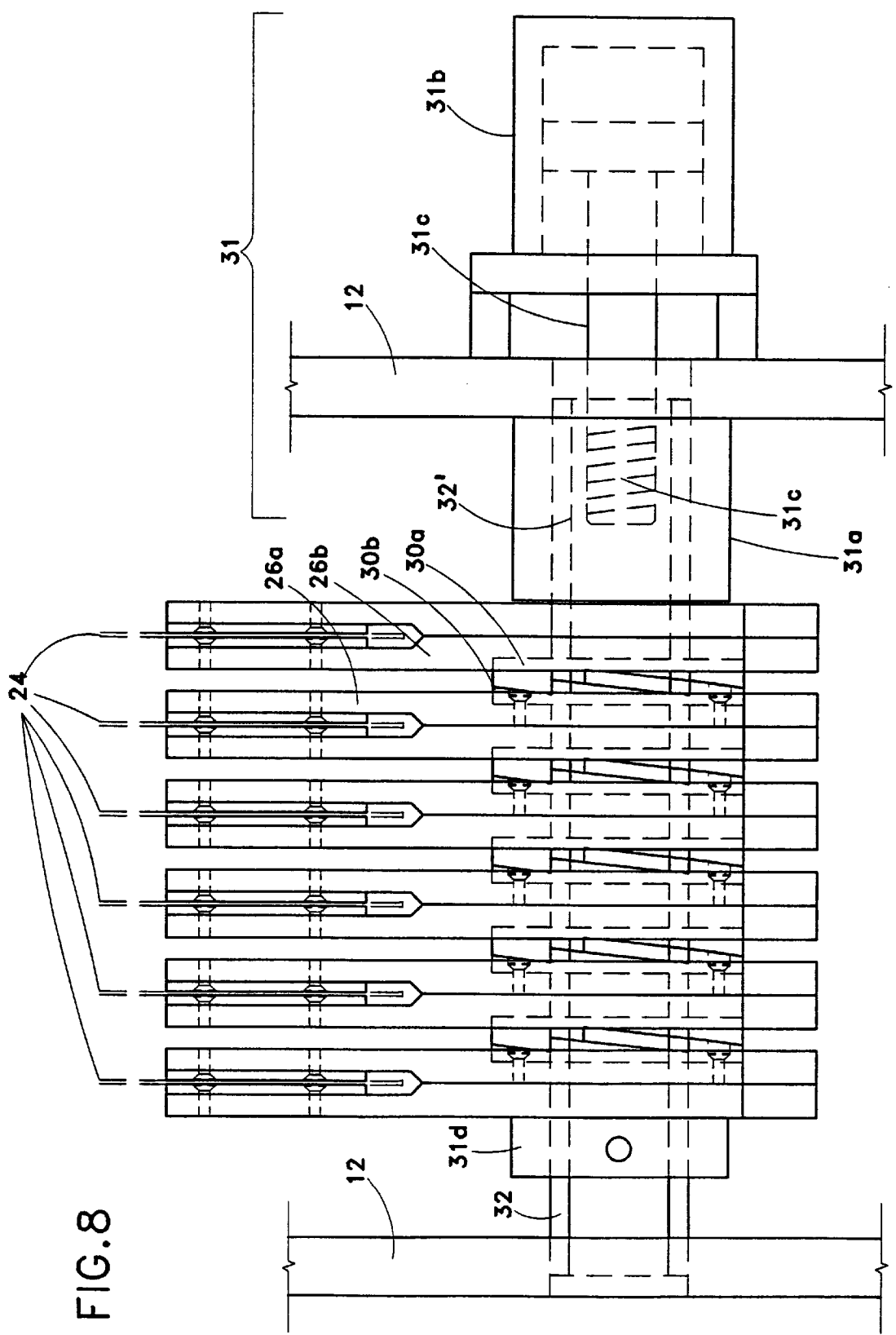

INCLINE DISC VARIABLE TARGET SIZE SAWGUIDES FOR CIRCULAR GANG SAWS

This application claims benefit of provisional application No. 60/013,858, filed Mar. 22, 1996.

BACKGROUND OF THE INVENTION

In the prior art, circular gang saws are typically mounted on a splined arbor. The saws in the gang saw are stabilized and positioned relative to each other on the splined arbor by sawguides. Each saw within the gang saw has a corresponding sawguide. Each sawguide has an opposed pair of rigid members spaced apart to allow the saw blade to pass between the opposed rigid members. The opposed rigid members support babbitt pads or the like which rub against the sides of the saw blade. The sawguides are sandwiched together in a laterally extending array across the laterally extending circular gang saw by means of a hydraulic press.

It is desirable to change the relative spacing between saws in the circular gang saw in order to cut different sized lumber from a cant being fed into the gang saw. In the prior art, changing the spacing between the saws in the gang saw meant stopping operation of the gang saw, releasing the hydraulic press, removing the sawguides and the corresponding saw blades and replacing the sawguides with sawguides of a different thickness and reassembling the gang saw with the saw blades set at the new spacing dictated by the new sawguides. This process typically caused considerable down time and lost productivity. It did not allow for the quick changing of the lumber target size for which the gang saw was preset.

Consequently, it is an object of the present invention to provide a circular gang saw having adjustable sawguides, adjustable by means of a remote control system and selectively actuable actuators so as to thereby reduce the time required to change lumber target size, the device not requiring the breakdown and reassembly of the sawguides in order to change lumber target size.

SUMMARY OF THE INVENTION

An apparatus for the adjustment of gang saw spacing guides adjusts gang saw saw blades to different target lumber sizes in gang saws, without having to dismantle the gang saw to remove and replace each sawguide. The gang saws are equipped with splined saw blade arbors. The sawguides may be of the babbitt pad type which hold the blades in position by contacting the blade sides with the sawguide pads. Each sawguide pair incorporates a pair of cooperating inclined discs, with one disc being attached to a sawguide bar that runs through the edger and with the other disc being attached to one of the sawguide pairs. The sawguide bar has two opposing flat surfaces that allows the one disc to turn with the sawguide bar as it is rotated, and slide on the sawguide bar when adjusting to the desired width of saw spacing. The sawguide bar is rotated by an actuator which is selectively controlled for precise movements. Once the sawguide bar has been selectively rotated to preset the desired spacing between the pairs of sawguides, a hydraulic press, de-actuated prior to rotating the sawguide bar, is re-actuated to press together the array of sandwiched sawguides.

In summary, the device of the present invention for selectively actuable positioning of sawguides for circular gang saws includes a first collar releasably slidably journalled onto a selectively rotatable shaft so as to lie in a first plane generally perpendicular to the shaft. The first collar has a first helically inclined cam surface extending between a first thin portion of the first collar and a first thick portion of the first collar. A second collar is rigidly mountable by mounting means onto the shaft so as to lie in a second plane generally parallel to the first plane such that the second collar is rotatable with the shaft. The second collar has a helically inclined cam follower surface, such as a second helical inclined cam surface, extending between a second thin portion of the second collar and a second thick portion of the second collar. The first collar is releasably slidably journalled onto the shaft so as to be adjacent the second collar and so that the helically inclined cam surface is in opposed facing mating relation to the helically inclined cam follower surface. The helically inclined cam follower surface is adapted for sliding engagement over the first helically inclined cam surface upon selective rotation of the shaft. The selective rotation of the shaft in a first direction slides the helically inclined cam follower surface over the helically inclined cam surface to thereby slide the second thick portion from alignment with the first thin portion towards alignment with the first thick portion. The first collar is rigidly mounted, on a side of the first collar opposite the helically inclined cam surface, to a first sawguide. The first sawguide is slidably mounted onto the shaft. A second sawguide is slidably mounted onto the shaft so as to be snugly adjacent a side of the second collar opposite the helically inclined cam follower surface, whereby the selective rotation of the shaft in the first direction forces the first and second sawguides apart. Means, such as a press, are provided for urging the first and second sawguides slidably towards each other along the shaft so as to clamp the first and second collars therebetween.

The helically inclined cam surface may be a radially distributed plurality of helically inclined cam surfaces around a circumferentially extending first surface of the first collar, and the helically inclined cam follower surface may be a radially distributed plurality of helically inclined cam follower surfaces around a circumferentially extending first surface of the second collar. The helically inclined cam follower surfaces correspond, so as to cooperate with, to the helically inclined cam surfaces for sliding mating thereon when the first surfaces of the first and second collars are in abutting mating adjacency.

Advantageously, the first and second collars each further include an aperture for releaseable mounting of the first and second collars on the shaft. The aperture permits the collars to be removed from the shaft without the removal of the shaft from the gang. The aperture in the second collar may be "u" shaped and sized for snug sliding engagement over corresponding mating surfaces on the shaft. The aperture in the second collar has opposed generally parallel and planar side walls and the corresponding mating surfaces on the shaft may be correspondingly generally parallel and planar.

The invention provides other advantages which will be made clear in the description of the preferred embodiments.

BRIEF DESCRIPTION OF THE DRAWINGS

The invention will be better understood by reference to the accompanying drawings, wherein:

FIG. 8 is the view of FIG. 3 showing a known hydraulic press.

DETAILED DESCRIPTION OF THE PREFERRED EMBODIMENT

Figure 1:
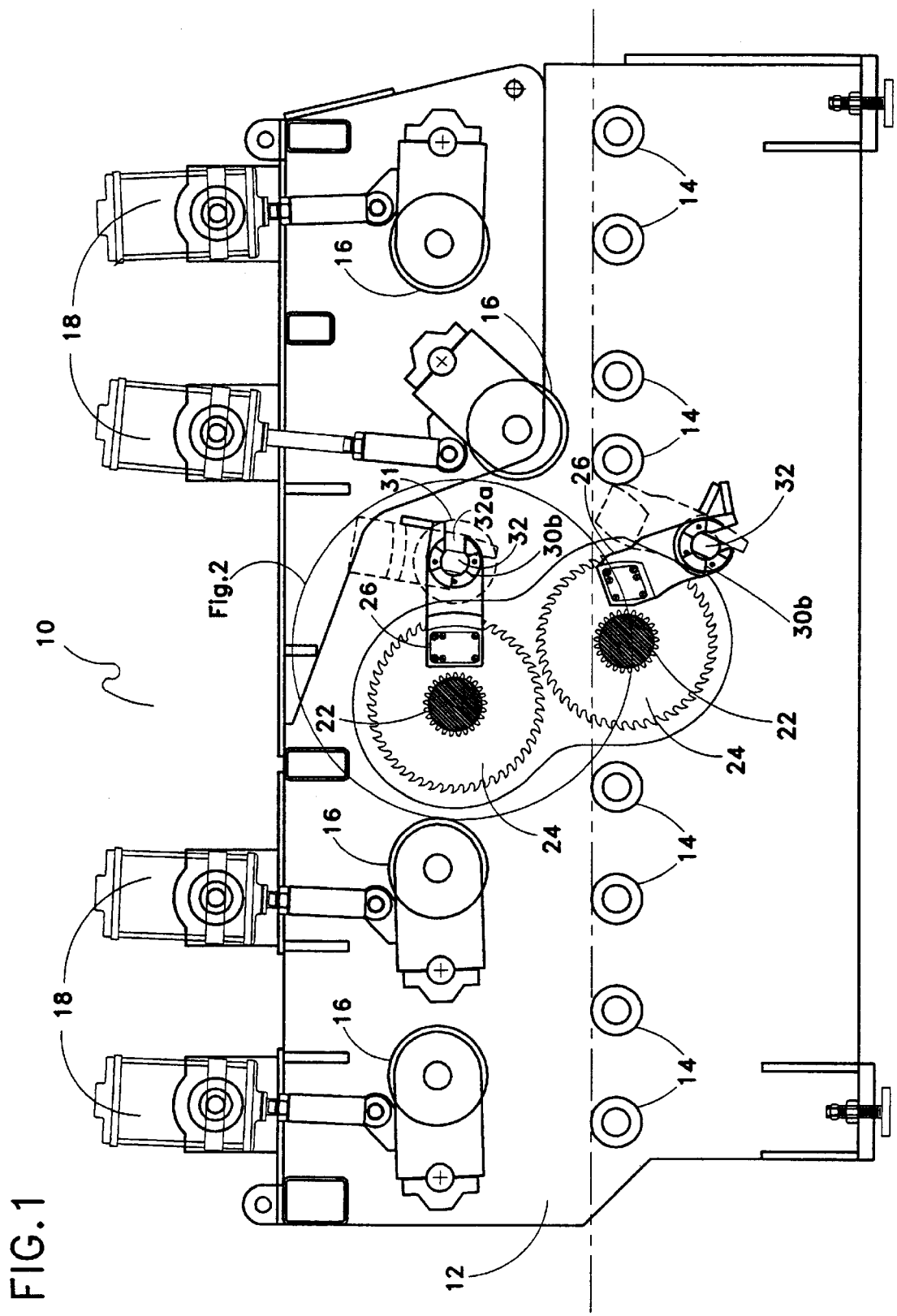
FIG. 1 is a side elevation view according to a preferred embodiment of the invention.
Figure 2:
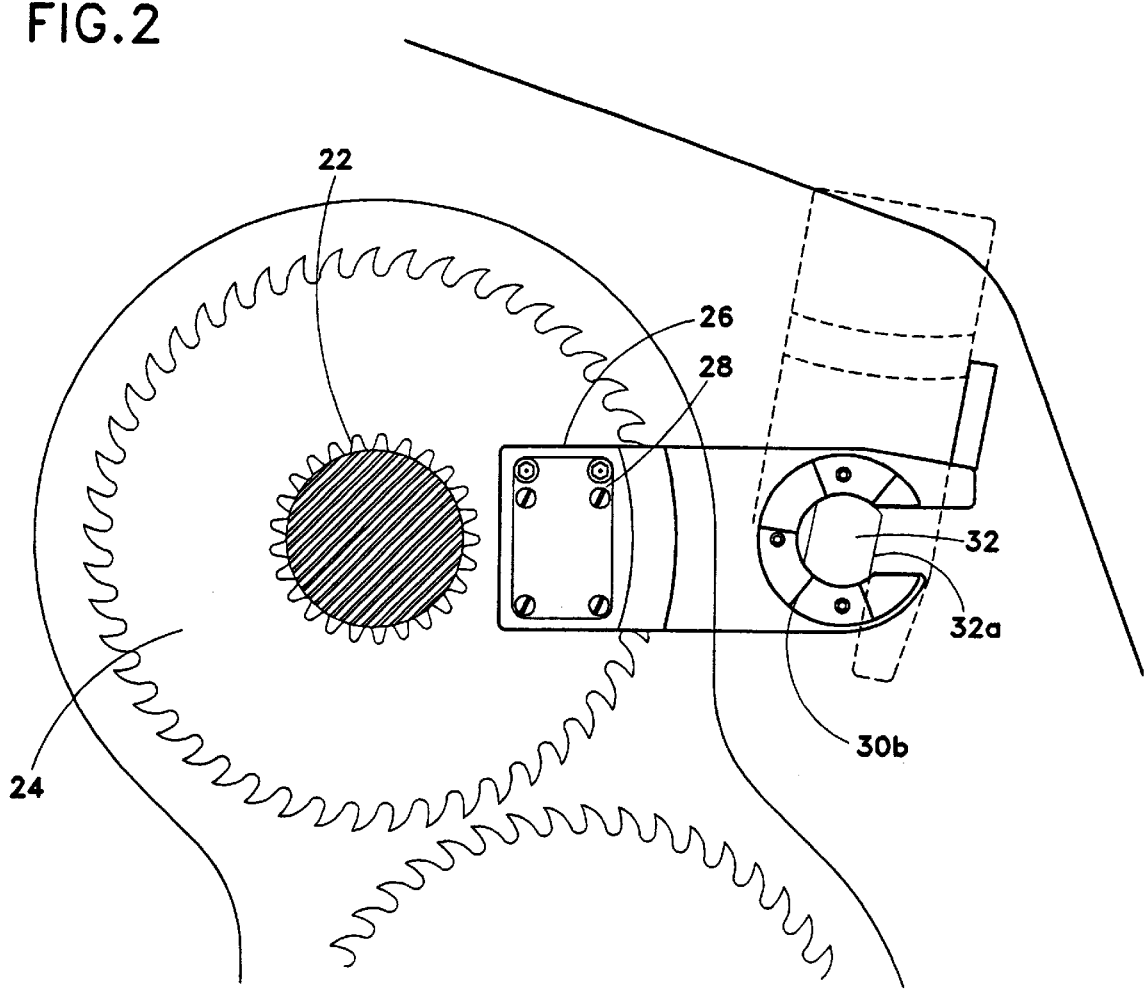
FIG. 2 is an enlarged, fragmentary, side elevation view from FIG. 1, showing sawguides in their down (operating) position and with dashed lines showing the sawguides in the saw removal position.
Figure 3:
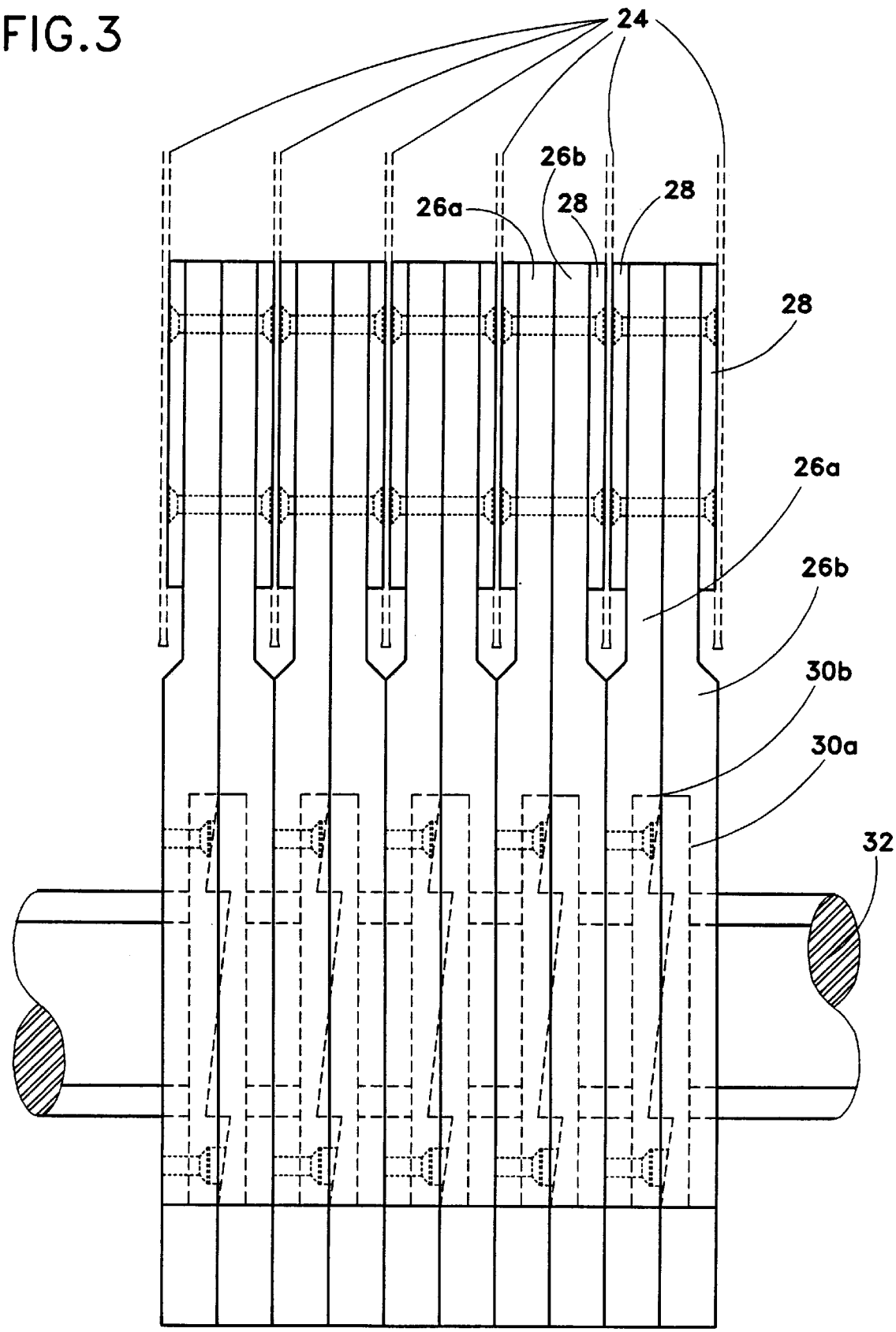
FIG. 3 is an enlarged, fragmentary, side cross-sectional view of the sawguides in their minimized spacing position.
Figure 4:
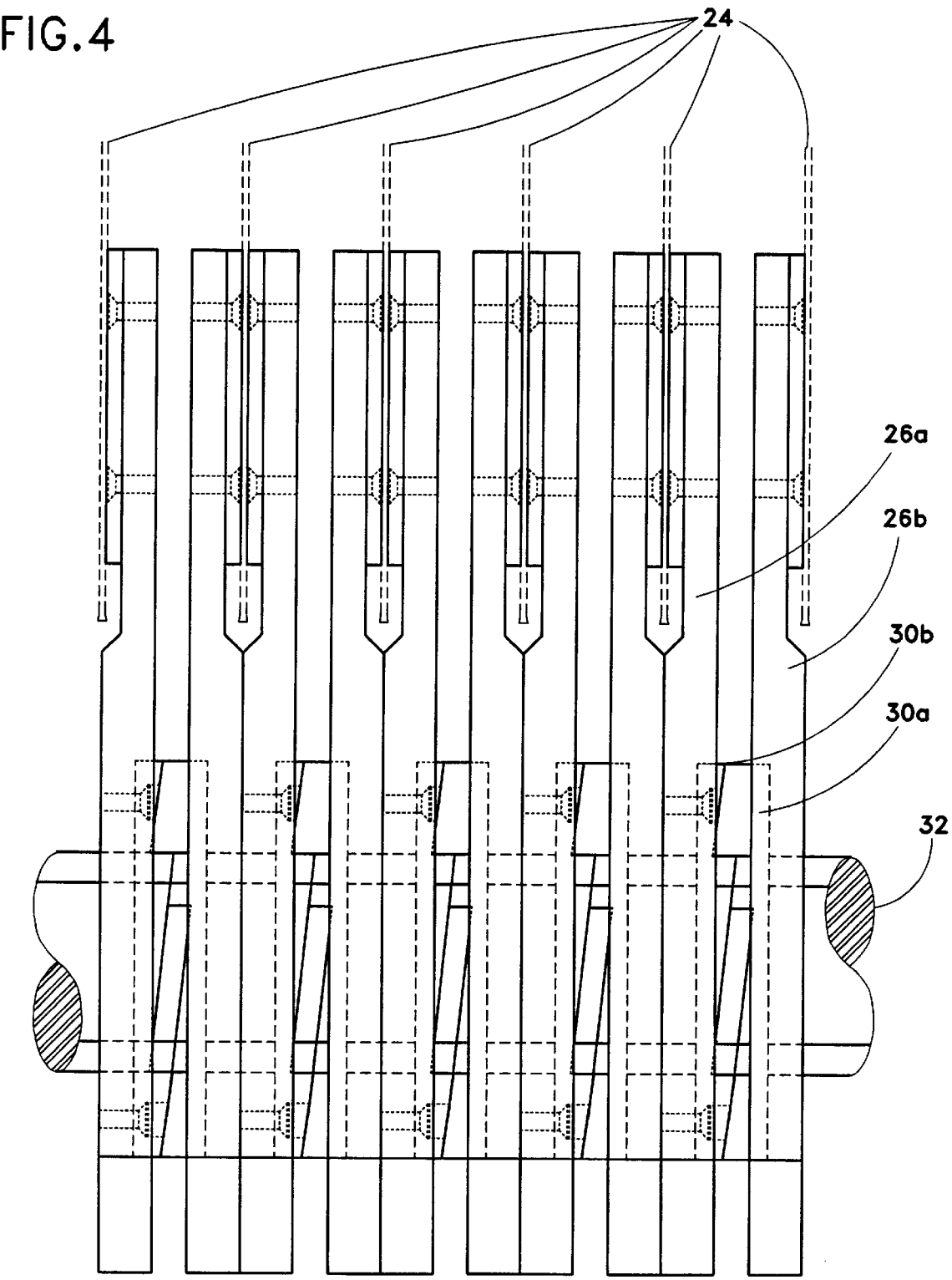
FIG. 4 is an enlarged, fragmentary, side cross-sectional view of the sawguides in their maximized spacing position.
Figure 5:
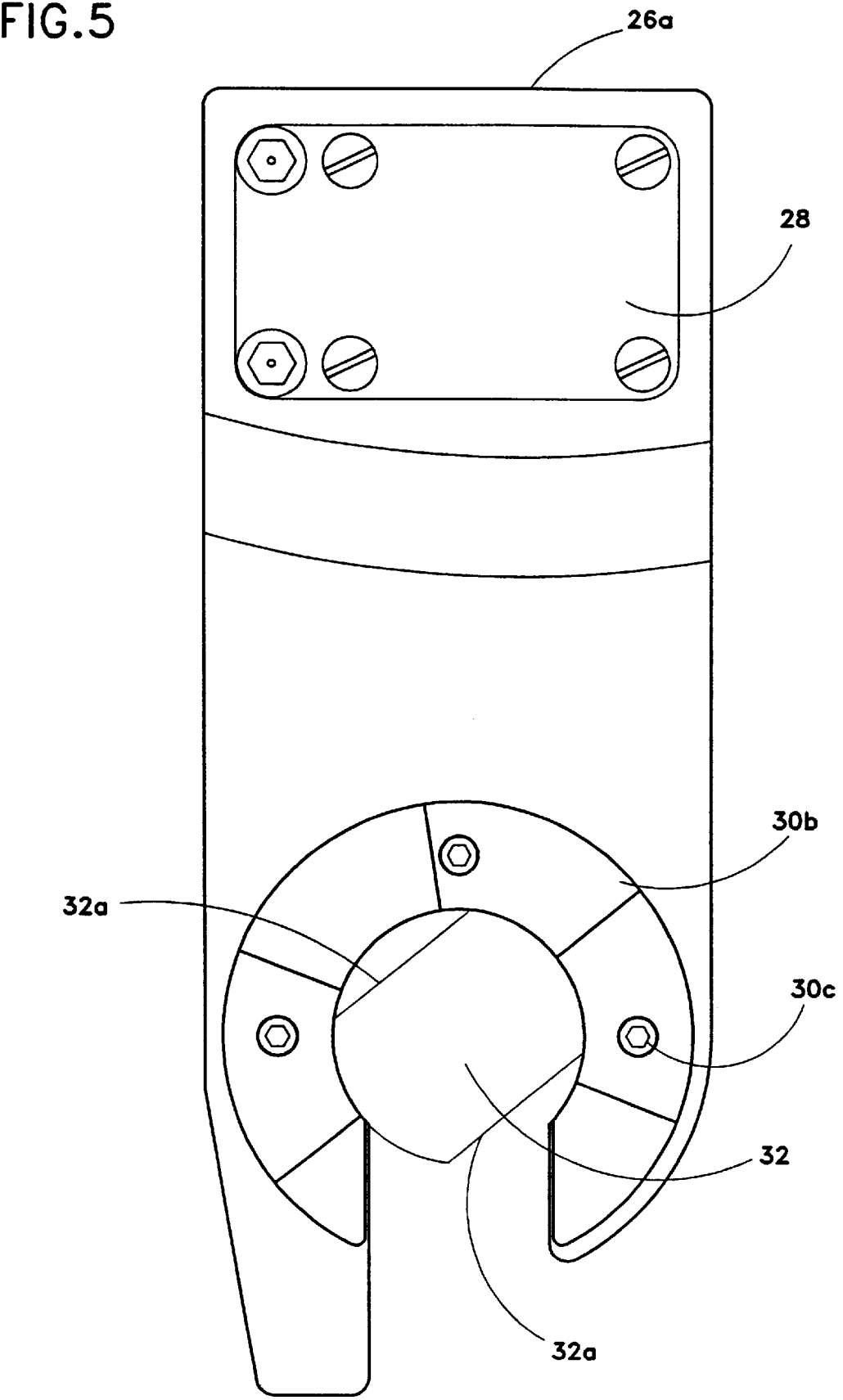
FIG. 5 is an enlarged side elevation view of a sawguide mounted on a sawguide bar.
Figure 6A:
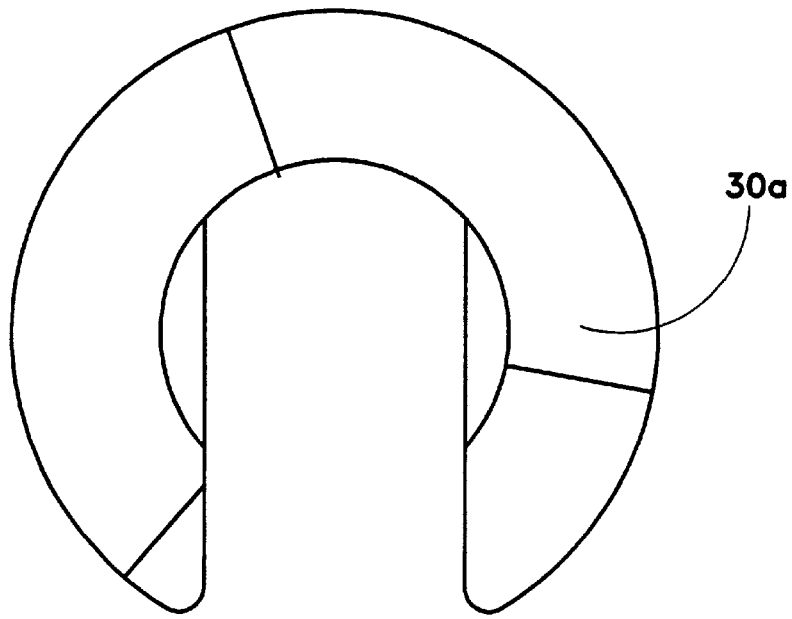
FIG. 6a is an enlarged side view of a first incline disc that rotates with the sawguide bar.
Figure 6B:
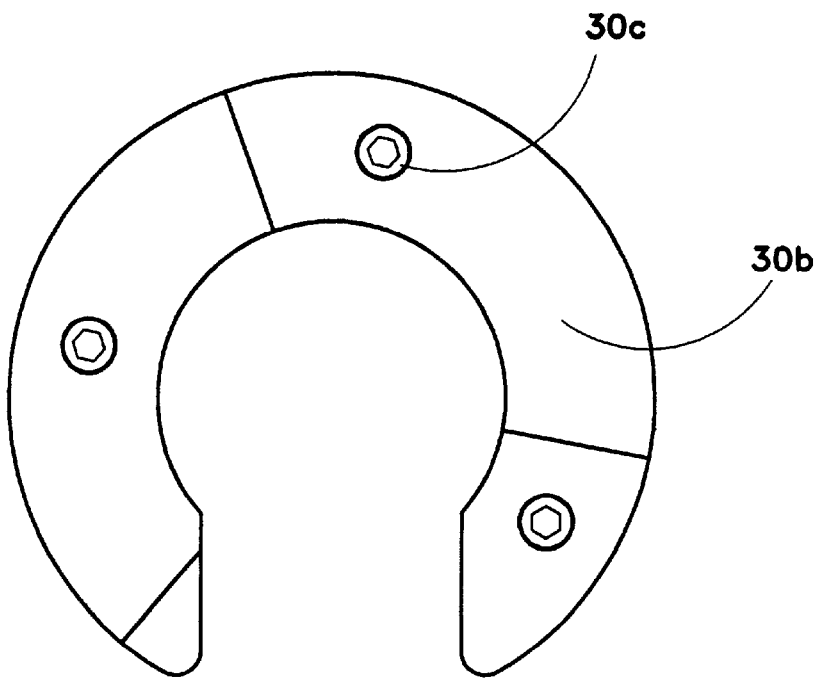
FIG. 6b is an enlarged side view of a second incline disc that is fixed to one of the sawguide sets.
Figure 7A:
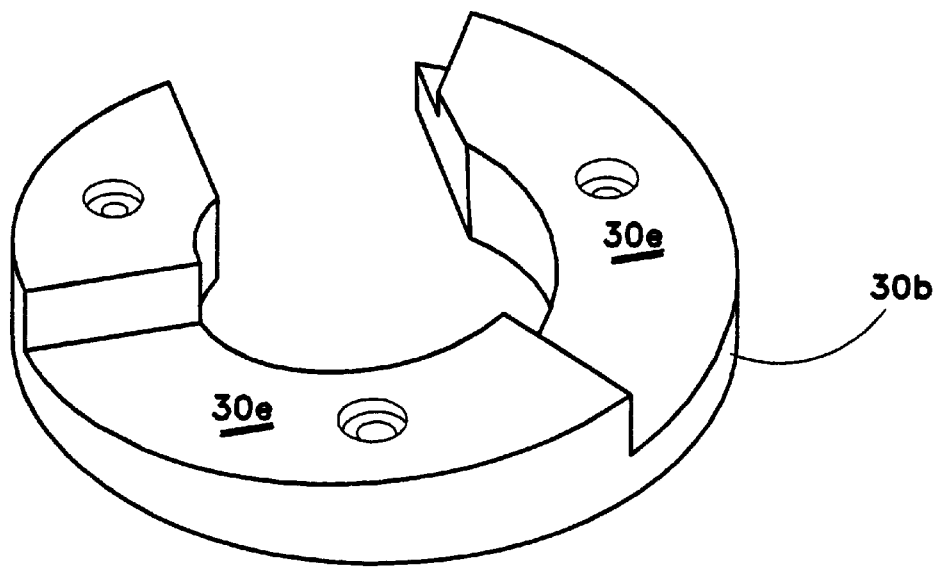
FIG. 7a is a perspective view of the second incline disc.
Figure 7B:
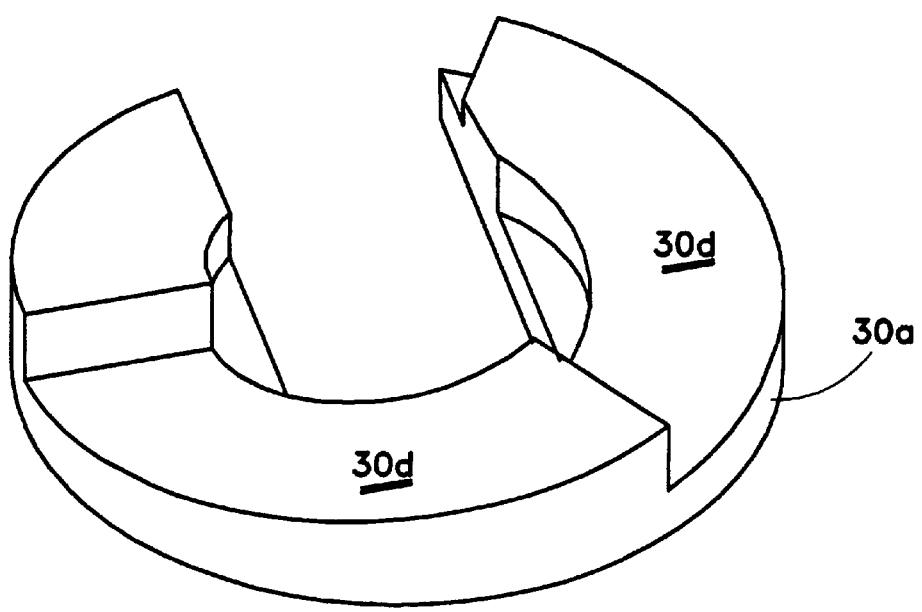
FIG. 7b is a perspective view of the first incline disc.

Referring to the drawing figures wherein similar characters of reference represent corresponding parts in each view, the apparatus is generally indicated by the reference numeral 10. As seen in FIG. 1, the apparatus 10 includes a support frame constructed of various vertical and horizontal structural plates 12, a plurality of driven feed rollers 14 cooperating with press rolls 16 actuated by actuating cylinders 18. Splined saw arbor 22 has a plurality of saw blades 24 slidingly mounted thereon, the splines on saw arbor 22 mating with corresponding teeth on saw blades 24. Each saw blade 24 includes a sawguide set 26. As seen in FIGS. 2, 3 and 4 each sawguide set 26 has two sawguide plates 26a and 26b. The sawguide sets 26 include sawguide pads 28. The sawguide pad 28 contacts the saw blades 24, on each of the opposing sides of the blade.

The spacing between sawguide sets 26 is dictated by the relative rotational position of cooperating incline discs or collars 30a and 30b. Discs 30a and 30b are better seen in FIGS. 5, 6a, 6b, 7a and 7b. Incline disc 30a is mounted on to the sawguide bar or shaft 32 and has a generally rectangular opening which engages the flat sides 32a of the sawguide bar 32. The corresponding incline disc 30b is mounted to sawguide plate 26a by means of fasteners 30c. The sawguide sets 26 and the incline discs 30a and 30b are pressed together with a hydraulic press 31 known in the art and as better seen in FIG. 8. The hydraulic press is backed off when changing lumber target size settings, or when changing range sizes, sawguide pads or saw blades. As well known in the art, hydraulic press 31 includes spacing collar 31a slidibly mounted on bar end 32' of bar 32. Hydraulic cylinder 31b is mounted to plate 12 adjacent bar end 32' and has rod 31c threadably mounted through plate 12 into bar end 32'. Collar 31d is rigidly mounted to the opposite end of bar 32, opposite from bar end 32', snugly against the outermost sawguide, whereby retracting rod 31c into cylinder 31b compresses the sawguides and inclined discs between collars 31a and 31d.

When it is desired to change the relative spacing between the saw blades 24 in the gang saw so as to, for example, re-set the lumber target size, the hydraulic press is de-pressurized to remove the force sandwiching the sawguides together. The sawguide bar 32 may then be rotated a predetermined amount about its longitudinal axis by a stepping motor or hydraulic cylinder (or other means, not shown), as desired to accomplish the particular target lumber size needed. The incline disc 30a mounted in mating contact with the flat sides 32a of the sawguide bar 32 rotates with the sawguide bar 32. The inclined surfaces 30d on rotating disc 30a, when rotated in a first direction ride up the inclined surfaces 30e on the incline disc 30b which is fixed to the sawguide plate 26a. This action forces the sawguide sets 26 apart as shown in FIG. 4, thus changing the spacing of the saw blades 24 from that of FIG. 3.

When the sawguide bar 32 is rotated in the opposite direction, the sawguide sets 26 are moved together again changing the spacing of the saw blades. The hydraulic press holds residual pressure against the sawguides sets 26 and the discs 30a and 30b to help prevent any incorrect positioning of the discs and to help prevent debris from falling into the discs 30a and 30b as the lumber target size is adjusted. The hydraulic press is re-applied with substantial pressure once the adjustment has been made and the desired width is selected thus pressing the sandwich of sawguide sets 26 together, and clamping the sawguides sets 26, thus fixing the target lumber size.

When different zones or a different range of thickness of lumber target sizes are required, the hydraulic press is slackened off, the sawguide sets 26 slid apart and the incline disc 30b changed to a different width, to obtain the required different width range of lumber target size desired in that particular zone of the gang.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A device for selectively actuable positioning of sawguides for circular gang saws comprising:

a selectively rotatable shaft, a first collar slidably journalled onto said shaft so as to lie in a first plane generally perpendicular to said shaft, said first collar having a helically inclined cam surface extending between a first thin portion or said first collar and a first thick portion of said first collar, a second collar slidably and nonrotatably mounted by mounting means onto said shaft, so as to lie in a second plane generally parallel to said first plane, said second collar having a helically inclined cam follower surface extending between a second thin portion of said second collar and a second thick portion of said second collar, said first collar slidably journalled onto said shaft so as to be adjacent said second collar and so that said helically inclined cam surface is opposed facing mating relation to said helically inclined cam follower surface, said helically inclined cam follower surface adapted for sliding engagement over said helically inclined cam surface upon selective rotation of said shaft, said selective rotation of said shaft in a first direction sliding said helically inclined cam follower surface over said helically inclined cam surface to thereby slide said second thick portion from alignment with said first thin portion towards alignment with said first thick portion, said first collar rigidly mounted, on a side of said first collar opposite said helically inclined cam surface, to a first sawguide, said first sawguide slidably mounted onto said shaft, a second sawguide slidably mounted onto said shaft so as to be snugly adjacent a side of said second collar opposite said helically inclined cam follower surface, whereby said selective rotation of said shaft in said first direction forces said first and second sawguides apart, and means for pressing said first and second sawguides slidably towards each other along said shaft so as to clamp said first and second collars therebetween.

2. The device of claim 1 wherein said helically inclined cam surface is a radially distributed plurality of helically inclined cam surfaces around a circumferentially extending first surface of said first collar, and wherein said helically inclined cam follower surface is a radially distributed plurality of helically inclined cam follower surfaces around a circumferentially extending first surface of said second collar, said helically inclined cam follower surfaces corresponding to said helically inclined cam surfaces for sliding mating thereon when said first surfaces of said first and second collars are in abutting mating adjacency.

3. The device of claim 1 wherein said first and second collars each further comprise an aperture for removable mounting of said first and second collars on said shaft.

4. The device of claim 3 wherein said aperture in said second collar is "u"-shaped and corresponds to mating surfaces on said shaft for nonrotatable sliding engagement over the corresponding mating surfaces on said shaft.

5. The device of claim 4 wherein said "u"-shaped aperture in said second collar has opposed generally parallel and planar side walls and said corresponding mating surfaces on said shaft are correspondingly generally parallel and planar.

* * * * *